US011144237B2

(12) United States Patent
Chabbi et al.

(10) Patent No.: US 11,144,237 B2
(45) Date of Patent: Oct. 12, 2021

(54) CONCURRENT READING AND WRITING WITH CRASH RECOVERY IN PERSISTENT MEMORY

(71) Applicant: HEWLETT PACKARD ENTERPRISE DEVELOPMENT LP, Houston, TX (US)

(72) Inventors: Milind M. Chabbi, Palo Alto, CA (US); Yupu Zhang, Palo Alto, CA (US); Haris Volos, Palo Alot, CA (US); Kimberly Keeton, San Francisco, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 67 days.

(21) Appl. No.: 16/529,142

(22) Filed: Aug. 1, 2019

(65) Prior Publication Data

US 2021/0034281 A1 Feb. 4, 2021

(51) Int. Cl.
*G06F 12/00* (2006.01)
*G06F 3/06* (2006.01)
*G06F 12/1072* (2016.01)
*G06F 12/1081* (2016.01)
(Continued)

(52) U.S. Cl.
CPC .......... *G06F 3/0655* (2013.01); *G06F 3/0604* (2013.01); *G06F 3/0679* (2013.01); *G06F 12/1072* (2013.01); *G06F 12/1081* (2013.01); *G06F 2212/621* (2013.01); *G06F 2212/656* (2013.01)

(58) Field of Classification Search
CPC .... G06F 3/0655; G06F 3/0679; G06F 3/0604; G06F 12/1072; G06F 12/1081; G06F 2212/656; G06F 2212/621
See application file for complete search history.

(56) References Cited

U.S. PATENT DOCUMENTS

| 7,395,263 B2 | 7/2008 | McKenney |
| 9,996,402 B2 | 6/2018 | Yadav |
| 10,140,036 B2 | 11/2018 | Kelner et al. |

(Continued)

FOREIGN PATENT DOCUMENTS

WO WO-2017074451 A1 5/2017

OTHER PUBLICATIONS

Alexander Matveev et al., "Read-Log-Update," Oct. 2015, pp. 1-16, ACM.

(Continued)

*Primary Examiner* — Mark A Giardino, Jr.
(74) *Attorney, Agent, or Firm* — Hewlett Packard Enterprise Patent Department (57) ABSTRACT

Systems and methods for concurrent reading and writing in shared, persistent byte-addressable non-volatile memory is described herein. One method includes in response to initiating a write sequence to one or more memory elements, checking an identifier memory element to determine whether a write sequence is in progress. In addition, the method includes updating an ingress counter. The method also includes adding process identification associated with a writer node to the identifier memory element. Next, a write operation is performed. After the write operation, an egress counter is incremented and the identifier memory element is reset to an expected value.

20 Claims, 8 Drawing Sheets

(51) Int. Cl.
*G06F 13/00* (2006.01)
*G06F 13/28* (2006.01)

(56) References Cited

U.S. PATENT DOCUMENTS

| | | | |
|---|---|---|---|
| 10,423,464 B2 | 9/2019 | Lillibridge et al. | |
| 2015/0270000 A1* | 9/2015 | Perego | G06F 12/10 711/103 |
| 2015/0286586 A1* | 10/2015 | Yadav | G06F 12/1466 711/152 |

OTHER PUBLICATIONS

Andreia Correia et al., "Romulus: Efficient Algorithms for Persistent Transactional Memory," Jul. 2018, pp. 271-282, ACM.

Mickey Vanska, "Recoverable FCFS Mutual Exclusion with Wait-free Recovery," Distributed Computing Seminar, Apr. 17, 2018, pp. 1-75.

Naama Ben-David et al., "Making Concurrent Algorithms Detectable," Carnegie Mellon University, Jun. 12, 2018, pp. 1-17.

Rachid Guerraoui and Ron Levy, "Robust Emulations of Shared Memory in a Crash-recovery Model," EPFL, Aug. 8, 2003, pp. 1-10.

Shahram Ghandeharizadeh and Haoyu Huang, "Gemini: A Distributed Crash Recovery Protocol for Persistent Caches," Dec. 2018, pp. 1-29, USC, Los Angeles, CA, USA.

Corbet, "Driver Porting: Mutual Exclusion with Seqlocks", available online at <https://lwn.net/Articles/22818/>, Eklektix, Inc., Feb. 14, 2003, 2 pages.

Golab et al., "Recoverable Mutual Exclusion: [Extended Abstract]", In Proceedings of the 2016 ACM Symposium on Principles of Distributed Computing (PODC '16), Jul. 2016, pp. 65-74.

Leslie Lamport, "Concurrent Reading and Writing", Communications of the ACM, vol. 20, No. 11, Nov. 1977, pp. 806-811.

Mohan et al., "ARIES: A Transaction Recovery Method Supporting Fine-Granularity Locking and Partial Rollbacks Using Write-Ahead Logging", ACM Transactions on Database Systems, vol. 17, No. 1, Mar. 1992, pp. 94-162.

* cited by examiner

CONCURRENT READING AND WRITING WITH CRASH RECOVERY IN PERSISTENT MEMORY

BACKGROUND

Byte-addressable non-volatile memory technologies are becoming ubiquitous in computer systems. This technology trend indicates the availability of large pools of non-volatile memory accessible for a large number of disaggregated nodes (e.g., CPUs). In highly parallel, many-component systems, node failures are expected to become more common. In such systems, it is undesirable to suspend an entire system if a single node/process crashes. Distributed Lock Managers can handle process failures in distributed systems, albeit at a very high overhead.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below may now be disclosed. In the interest of clarity, not all features of an actual implementation are described in this specification. It may be appreciated that in the development of any such actual implementation, numerous implementation-specific decisions may be made to achieve the developers' specific goals, such as compliance with system-related and business-related constraints, which may vary from one implementation to another. Moreover, it may be appreciated that such a development effort, even if complex and time-consuming, would be a routine undertaking for those of ordinary skill in the art having the benefit of this disclosure.

It is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

The proliferation of non-volatile memory technology has led to the re-design of software concurrency control in the context of system crashes (e.g., process crash, power outage, kernel panic, node failure, etc.). For example, concurrency protocols that can manage partial failures have become of interest. Accordingly, a recovery process that targets the recovery of specific nodes while allowing the functional nodes to be accessed is desirable.

In some implementations, persistent memory may illustratively be embodied as non-volatile memory, such as storage class memory, having characteristics that include, but are not limited to, byte addressability of data organized as logical constructs (e.g., as a file or region), in the memory. In addition, shared, persistent and byte-addressable memory may include memory locations that are addressable by a processor for storing software programs and data structures associated with the embodiments described herein.

Mutual-exclusion recoverable systems generally involve locks which can survive partial failures by maintaining a lock state in non-volatile memory such that a process recovering from a crash can reconstruct its state and continue from a crash point. Many mutual-exclusion recoverable systems permit concurrency between multiple read nodes (e.g., readers) during normal operations. Some previous efforts blocked each process (e.g., thread) attempting to execute critical section(s) whether the crash resulted from a read or write sequence. A protocol that relaxes these constraints and allows for greater concurrency is desired. In addition, since read operations are more common compared to write operations, read protocols may be made sufficiently fast and efficient.

In concurrent programming, concurrent accesses to shared resources can lead to unexpected or erroneous behavior so areas of a program where a shared resource is accessed are protected and thereby denied access to other processes. Protected sections are referred to as "critical sections," which cannot be executed by more than one process at a time. A "critical section" may also include a code segment which is processed exclusively (e.g., has a mutual-exclusion property). As such, only a single process can execute its critical section at any given time. For instance, a critical section may be used to ensure that a shared resource, for example, a shared index data structure or shared row in a database table like a bank account balance, can be accessed by only one process at a time. Accordingly, a critical section may include a segment of a program that requires mutual exclusion of access (e.g., to a particular shared memory) by other processes or programs.

The present disclosure solves common problems associated with concurrent read and write operation crashes. Herein, concurrent reading is defined as a state where multiple readers read shared memory simultaneously. The present disclosure permits read operations to concurrently read shared data and memory even if a write operation is concurrently updating the same shared data and memory. The present disclosure provides a system that is non-blocking when read operations crash and blocking when a lock-holding write operation crashes. Although concurrent reading during an update of memory can result in errors, the present disclosure can detect crash events and infer that the memory read may be incorrect thereby causing such read operations to retry. In some implementations, dereferencing stale pointers by read operations during a write operation may be handled by a read operation depending on the nature of the critical section associated with a shared memory element presently being updated.

Thus, in some examples, a non-transitory computer-readable medium comprising computer-executable instructions stored thereon that, when executed by one or more processing units (e.g., processors), causes the one or more processing units to: in response to initiating a write operation to data in a shared memory, check a process identification ("PID") field to determine whether a write operation is in progress; if the write operation is not in progress, set the PID field to a unique process identification associated with a writer and increment an ingress counter atomically; perform the write operation to the shared memory; increment an egress counter; and reset the data in the PID field to an expected value.

In other examples, a non-transitory computer-readable medium comprising computer-executable instructions stored thereon that, when executed by one or more processing units, causes the one or more processing units to: in response to initiating a read operation of shared data, determine an egress counter value; perform the read operation of the shared memory; determine an ingress counter value; re-attempt the read sequence (including determining the egress counter value, performing the read operation and determining the ingress counter value) if the egress counter value is not equal to the ingress counter value; and determine that the read operation is valid if the egress counter value is equal to the ingress counter value.

In still other examples, a system consistent with one implementation of the present disclosure includes a memory fabric having a plurality of shared and byte-addressable, non-volatile memory; an ingress counter, which can be incremented before each write operation and an ingress counter value associated with each ingress counter is determined after each read operation; an egress counter, which can be incremented after each write operation and an egress counter value associated with each egress counter is determined before each read operation; and a PID field to hold an expected value or PID value associated with a writer when a writer first attempts to performs a write operation.

In some implementations, each writer maintains a unique process identification ("PID"). In some implementations, writing a PID in a non-volatile memory (e.g., a PID field) serves as a lock mechanism to perform mutual exclusion such that no other writer can write data to a particular shared memory element. Accordingly, when other writers attempt to write data to a shared memory element that is in a locked state, the writer is unable to access this particular shared memory element. In one implementation, a writer may institute a compare and swap memory operation (i.e., CAS memory operation or primitive) when updating the ingress and the PID of the lock.

In some implementations, a write operation includes comparing a held (e.g., stored) value within an identifier memory element (e.g., a PID field) with an expected value and writing a new value into the memory element if the comparison is true. In some implementations, comparing a held value within the memory element with the expected value and writing the new value into the memory element if the comparison is true is accomplished by employing a compare and swap memory operation. Herein, a compare and swap memory operation (i.e., a CAS memory operation) may be defined as an atomic instruction that compares an expected or known value to an actual value held in a memory element and swaps the held value with a new value if the held value is equal to the expected or known value. An atomic instruction or operation may be defined as a memory operation that completely occurs and has no effect at all if not completed.

In some implementations, the compare and swap memory operation may be employed according to a Remote Direct Memory Access ("RDMA") protocol. It should be understood by those having ordinary skill in the art having the benefit of this disclosure that various other atomic operations (e.g., test and set, fetch and add, etc.) may be native to a memory fabric described herein.

In some implementations, the CAS memory operation may include comparing the PID:ingresss-counter pair atomically. The data held in a PID field is compared with a well-known or expected value, and the ingress counter value is compared against the last known value of the ingress counter. In some implementations, as will be described below, the expected PID field value may be nil (e.g., 000000), "NONE," or some other value. Advantageously, the present disclosure provides a lock mechanism that provides mutual exclusion to ensure that write operations instituted by various writers are performed in a serialized manner.

In addition, to permit read operations to detect conflicts with a concurrent writer, a protocol disclosed herein maintains two 64-bit counters (e.g., ingress and egress counters) in the non-volatile memory. In some implementations, the ingress and egress counters are initially set to the same value and the read operations can read the ingress and egress counters but cannot increment them whereas a write operation increments both counters.

As will be described in more detail below, a writer (e.g., write node) first increments an ingress counter, then updates a shared memory, and then increments the egress counter. As such, the ingress and egress counters are unequal only when a write operation is presently updating the shared memory, in some implementations. In contrast, a read operation follows the opposite order of reading the ingress and egress counters, as a reader (e.g., read node) first reads an egress counter, then reads the shared memory, and then reads the ingress counter. At the end of a read operation, if the ingress and egress counters do not match, a reader infers that the shared memory it read is potentially invalid and hence retries the read sequence (e.g., the full read protocol as disclosed herein).

Notably, the present disclosure may be employed within a memory fabric of shared byte-addressable, memory. A memory fabric has the ability to access shared memory at very small, granular sizes (e.g., cache line size of 64 bytes) with atomic operations of eight or sixteen bytes using load and store operations executed by a processor. In some implementations, the memory fabric includes one or more memristors, phase change memory, resistive RAM (Re-RAM), magnetic RAM (MRAM), non-volatile dual in-line memory module (NVDiMM), or battery-backed dynamic random-access memory (DRAM), devices, and can comprise multiple cache line-sized blocks. In some implementations, the memory fabric includes shared byte-addressable, non-volatile memory. Advantageously, a memory fabric described herein can be shared by a plurality of nodes.

The present disclosure also permits recovery from a read or write operation failure (e.g., crash) during an actual read or write operation of one or more memory elements. In addition, the present disclosure offers a mutual exclusion strategy in a shared memory system in an efficient, self-service fashion. Notably, the present disclosure does not require a special recovery agent (e.g., a distributed lock manager) that suspends all other processes if one or more processes crash. As such, the present disclosure permits multiple processes to fail and recover simultaneously and for normal execution and crash recovery to operate concurrently, in some implementations.

Figure 1:
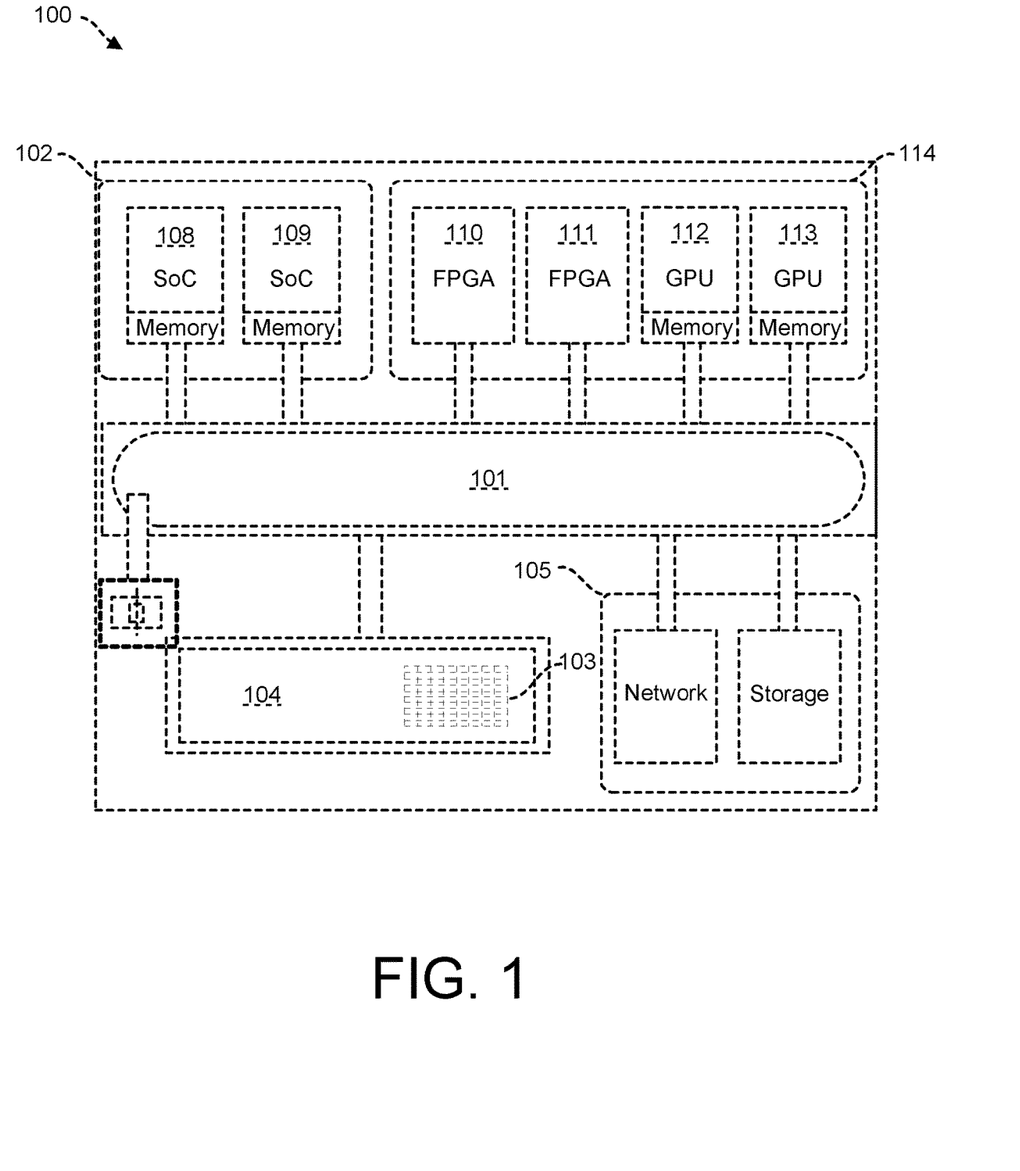
FIG. 1 is a computer network system consistent with a system and method of the present disclosure.

FIG. 1 is a computer network system 100 consistent with a system and method of the present disclosure. Notably, memory fabric 101 permits concurrent read and write operations without the need for a central manager (e.g., a Distributed Lock Manager). In some implementations, the present disclosure takes advantage of a computing system that performs more read operations than write operations. Memory fabric 101 may be compatible with a Generation Z ("Gen-Z") standard, a Compute Express Link standard ("CXL"), an Open Coherent Accelerator Processor Interface Architecture ("OpenCAPI") standard, or a Cache Coherent Interconnect for Accelerators ("CCIX") standard. However, the present disclosure is not limited to a memory fabric 101 that is compatible with the aforementioned standards but may be compatible with other designs and standards.

Computer network system 100 includes memory fabric 101 which is coupled to computer software and hardware devices. For example, computer network system 100 includes general-purpose processors 102 (e.g., system-on-a-chip, or "SoC" 108, 109 with local memory), accelerators 114 (e.g., FPGA's 110, 111 and Graphic Processing Units 112, 113), pooled memory 104, and input/output devices 105. Notably, memory fabric 101 includes a pool of shared byte-addressable, non-volatile memory 103 (i.e., shared memory) which can be accessed by concurrent readers and writers. Compute hardware, accelerators 114, and input/output devices 105 may access data from the shared memory 103 within the memory fabric 101.

Figure 2A:
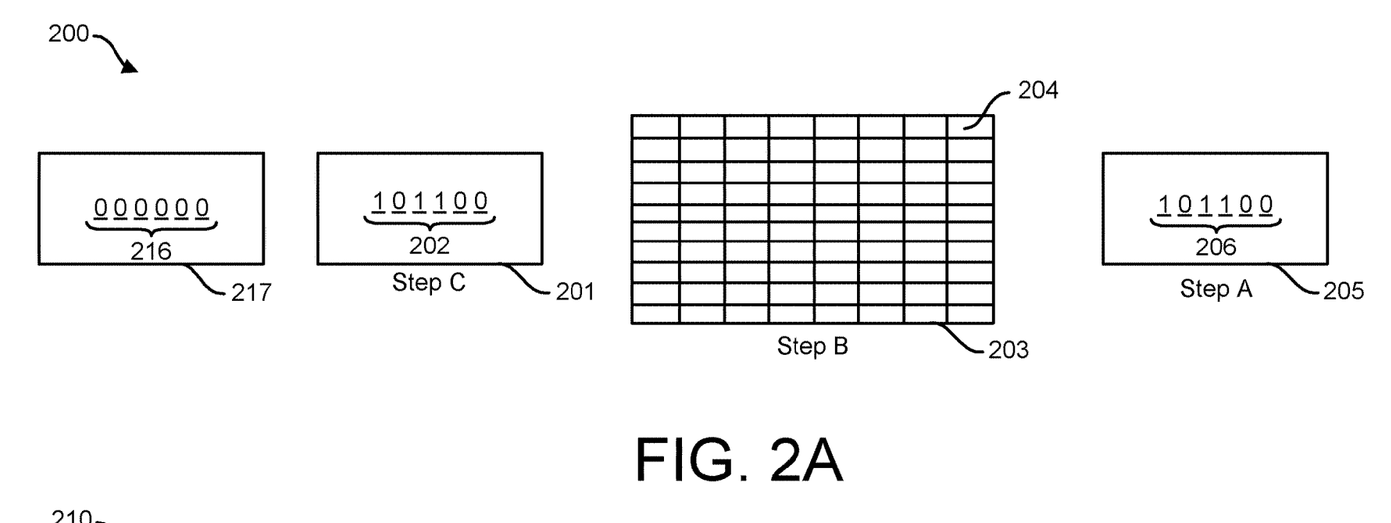
FIGS. 2A, 2B provide illustrations of process flows for read and write sequences consistent with the present disclosure.

FIGS. 2A, 2B illustrates process flows 200, 210 for read and write sequences consistent with the present disclosure. As shown in FIG. 2A, process flow 200 illustrates an example of a read sequence. The read sequence illustrated in process flow 200 begins with Step A by determining the counter value 206 held in the egress counter 205. Next, according to Step B, a reader performs a read operation on any of the memory elements 204 of a shared memory pool on a memory fabric 203. After the read operation concludes, the reader checks the counter value 202 held in the ingress counter 201 and compares the counter value 202 with the counter value 206 held in the egress counter 205 (Step C). In the event that the counter value 202 is numerically the same as the counter value 206, the reader determines that a write operation has not occurred during the read operation and therefore the data read during Step B is determined valid. It should be noted that the expected or known value 216 in the PID field 217 has not been changed as read sequences do not cause a change thereto (e.g., reader does not write its PID value into the PID field 217 during a read sequence).

Alternatively, in the event that the counter value 202 is not numerically the same as the counter value 206, the reader determines that write operation(s) has occurred during the read sequence. Accordingly, during the comparison (Step C), if the ingress and egress counter values 202, 206 are not numerically the same because the counter value 202 is greater than the counter value 206, the reader determines that a write operation has occurred during the read sequence. The read sequence (Steps A, B and C) may then be re-attempted to retrieve the most recent data in memory element 204. In some implementations, the read sequence may be re-attempted automatically based upon some pre-determined timeframe.

Figure 2B:
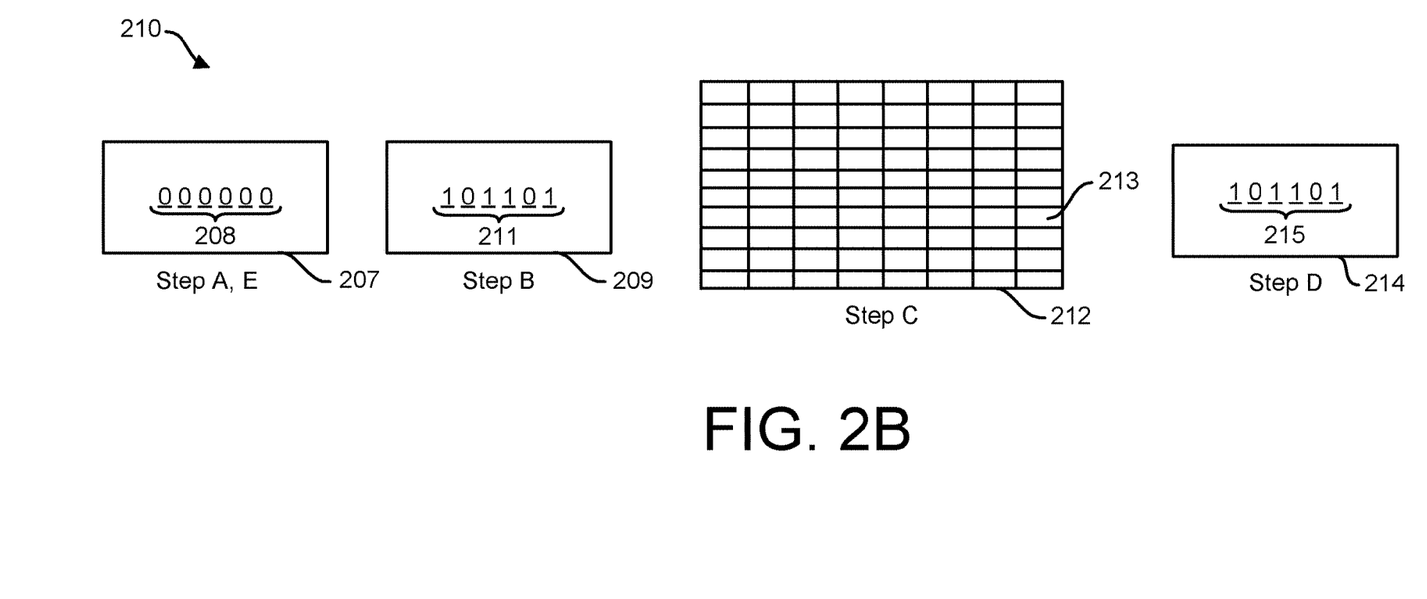

Next, as shown in FIG. 2B, process flow 210 illustrates an example of a write sequence. As shown, a write sequence begins with Step A by checking a PID value 208 in a PID field 207 for an expected or known value (e.g., nil or NONE). If the PID field 207 holds the expected value (e.g., nil or "NONE"), the writer (not shown) writes its unique PID value into the PID field 207. In one implementation, the process of checking and comparing the PID value 208 held in the PID field 207 with an expected or known value is performed by a CAS memory operation. In the event that the PID value 208 held is not the expected or known value, the writer ceases an attempt to execute a write sequence as it determines that the requested shared memory element to be written is locked by another writer. The writer can then reinitiate the write request at a later time. In some implementations, the write request is reinitiated automatically after a pre-determined time period.

In the implementations shown, the PID value 208 has six bits. However, the present disclosure is not limited thereto. In some implementations, the greater the number of bits in the PID value 208, the greater the number of writers that may have access to shared memory within the memory fabric 212. In addition, the counter value 211 also has six bits although the present disclosure is not limited thereto. The greater number of bits associated with the counter value 211 may determine the time that it takes for the ingress counter 209 (e.g., or egress counter 214) to roll back to zero.

In the event that the writer holds its PID value 208 in the PID field 207 and implements the lock mechanism, the writer increments the counter value 211 associated with the ingress counter 209 as shown in Step B. Next, according to Step C, a writer can write to any of the memory elements 213 (e.g., contiguous or non-contiguous) of shared memory within the memory fabric 212. After the write operation concludes, the counter value 215 within the egress counter 214 is incremented (Step D).

In addition, an ingress counter 209/egress counter 214/PID field 207 may be assigned to subsets of memory elements 213 in the shared memory pool on the memory fabric 212. In some implementations, each subset of memory elements 213 are often accessed together. Accordingly, assigning an ingress counter 209/egress counter 214/PID field 207 to a subset of memory elements 213 effects a fine-granularity lock (e.g., per-row locks for a database table) rather than a single lock for the entire shared memory pool, which can reduce the likelihood of false positives.

In one implementation, after the egress counter 214 is updated (e.g., by incrementing the counter value 215), the counter value 215 should be equal to the counter value 211 (e.g., 101101) of the ingress counter 209. Lastly, according to process flow 210, an expected value (e.g., nil or "NONE") is written back to the PID field 207.

Figure 3:
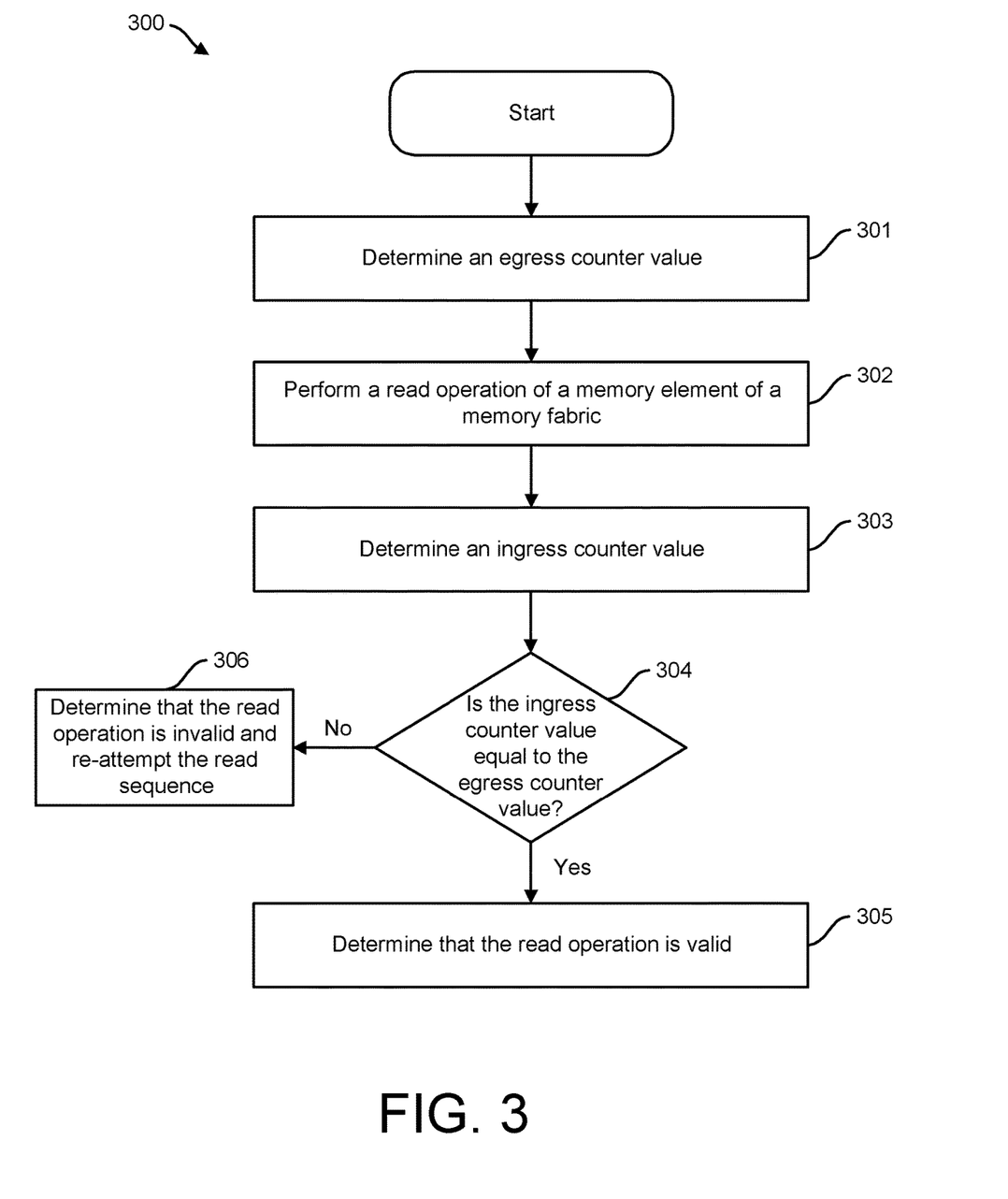
FIG. 3 is a method for performing concurrent read operations consistent with the present disclosure.

FIG. 3 is a flowchart 300 of a method for performing concurrent read operations consistent with the present disclosure. The method 300 begins with determining an egress counter value (block 301). Next, the method proceeds with performing a read operation of any of the memory elements of a shared memory on a memory fabric (block 302). Next, the method 300 as shown in method 300 proceeds with determining an ingress counter value (block 303). Lastly, the method 300 includes determining if the ingress counter value is equal to the egress counter value (block 304). If the ingress counter value is equal to the egress counter value, determine that the read operation is valid (block 305).

Alternatively, if the ingress counter value is not equal to the egress counter, determine that the read operation is invalid and re-attempt the read sequence (e.g., block 301) in accordance with block 306.

Figure 4:
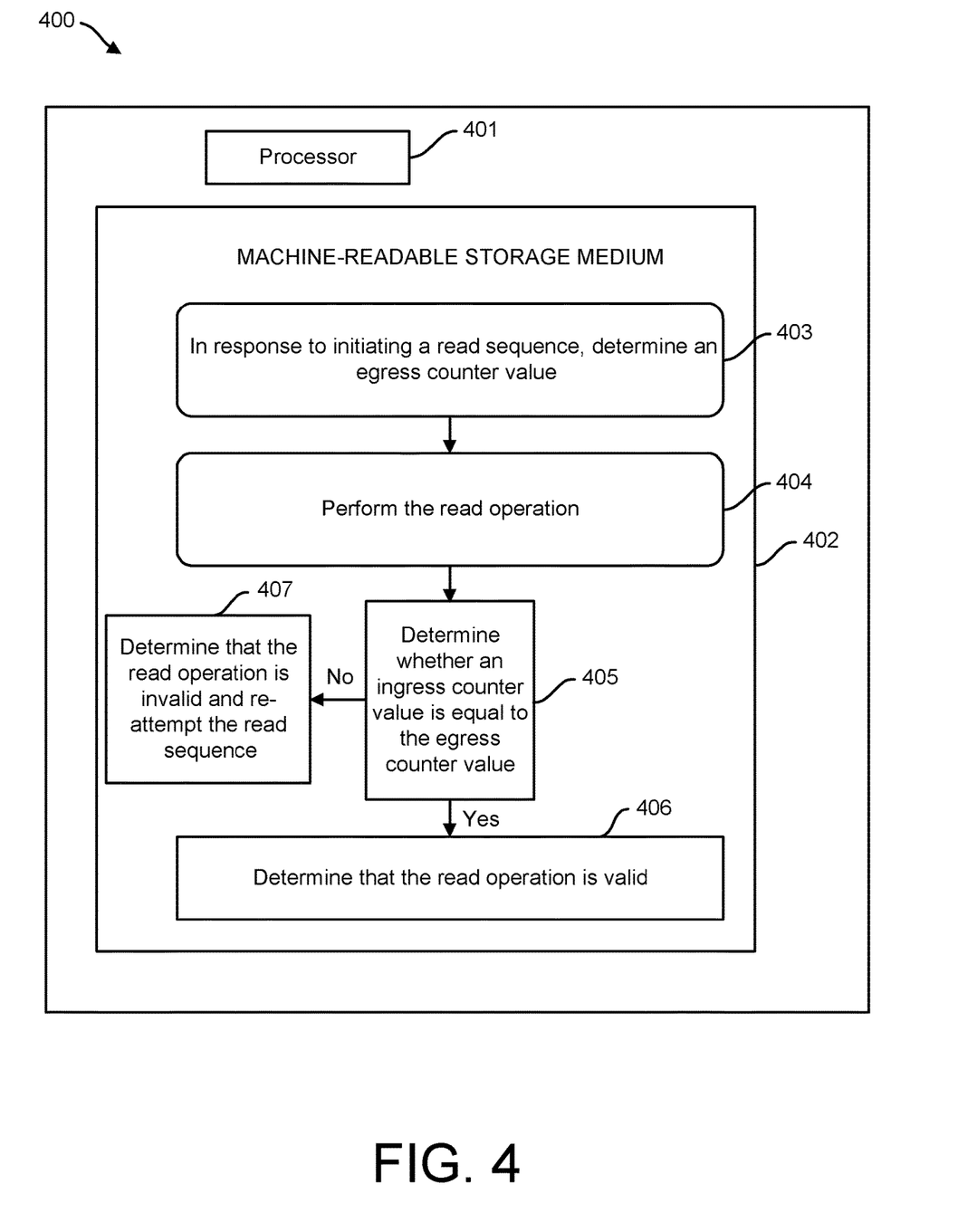
FIG. 4 is a computer network which can perform concurrent read operations, according to one or more examples of the present disclosure.

FIG. 4 is a computer network 400 which can perform concurrent read operations such as the concurrent read operation of FIG. 3, according to one or more examples of the present disclosure. Computer network 400 may include a non-transitory computer-readable medium 402 communicatively coupled to one or more processing units 401 (one shown). The computer-readable medium 402 includes computer-executable instructions 403-407 held thereon that, when executed by one or more processing units 401, causes the one or more processing units 401 to perform concurrent read operations.

Computer-executable instructions 403 permit computer network 400 to determine an egress counter value in response to initiating a read operation of any of a plurality of memory elements of a memory fabric. In some implementations, the memory fabric includes a shared byte-addressable, non-volatile memory and therefore the memory element to be read is byte-addressable. In addition, computer-executable instructions 404 permit computer network 400 to perform the read operation of any of the plurality of memory elements. Further, computer-executable instructions 405 permit computer network 400 to determine whether an ingress counter value is equal to the egress counter value. If the ingress counter value is equal to the egress counter value, determine that the read operation is valid (block 406). Alternatively, if the ingress counter value is not equal to the egress counter value, determine that the read operation is invalid and re-attempt the read sequence (e.g., repeat computer-executable instructions 403-406) in accordance with computer-executable instructions block 407.

Figure 5:
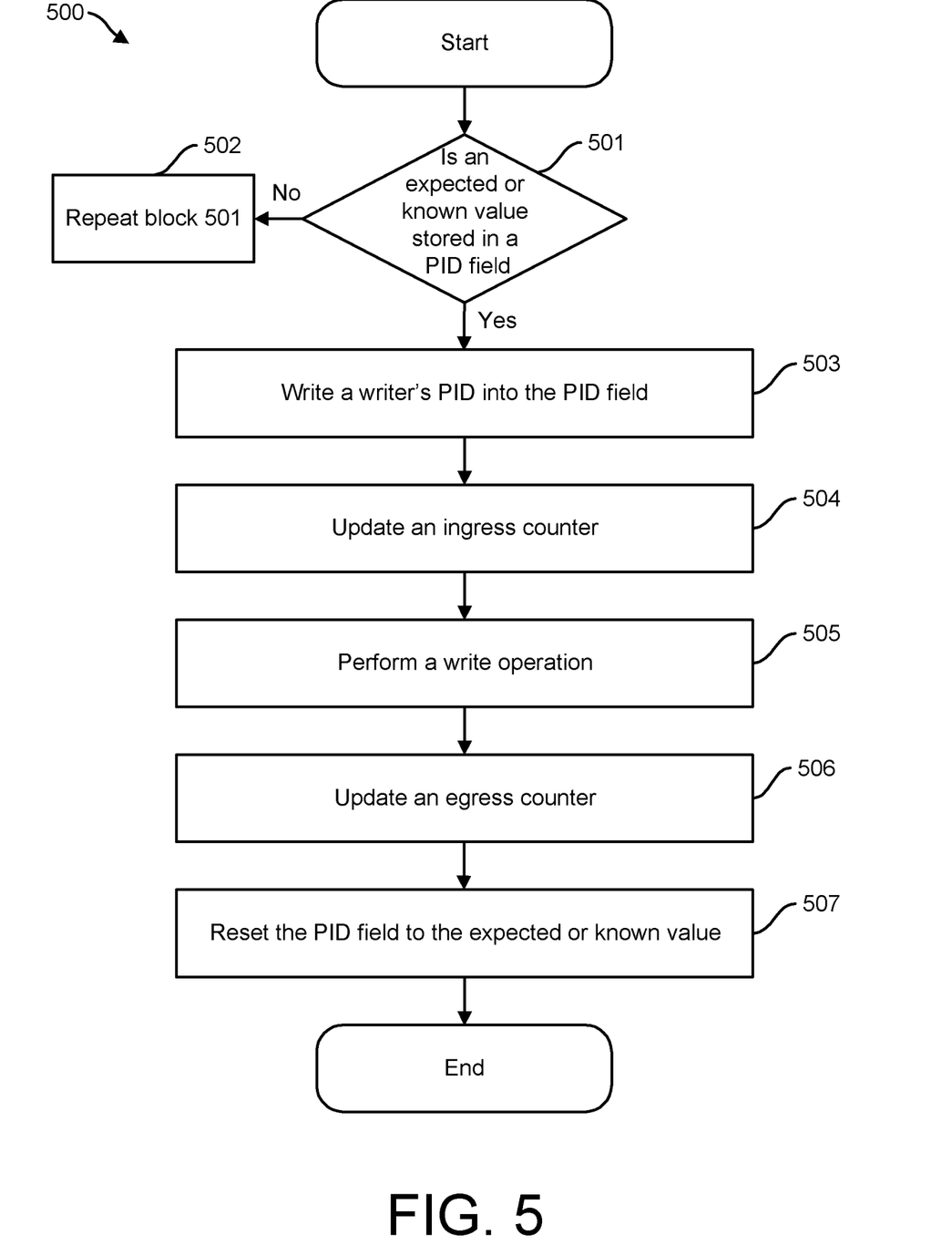
FIG. 5 is a method for performing concurrent write operations consistent with a system and method of the present disclosure.

FIG. 5 is a method 500 for performing concurrent write operations consistent with a system and method of the present disclosure. The method 500 as shown in FIG. 5 begins with determining whether an expected value is held in a PID field (block 501). If the expected value (e.g., "NONE") is presently held in the PID field, block 503 provides that the PID field is set to the writer's PID. In one implementation, the PID field is set to the writer's PID by writing the writer's PID into the PID field. Alternatively, according to block 502, if the expected value is not held in the PID field, repeat block 501.

After the PID field is set to the writer's PID, an ingress counter is incremented (block 504). In one implementation, blocks 503 and 504 are performed atomically when the writer first checks the PID field to determine the presence of the expected or known value and executes a compare and swap memory operation (e.g., a <ingress, PID> tuple from <old value, NONE> to <old value+1, PID>) to write the PID value into the PID field and increment the ingress counter. If the CAS succeeds, the writer proceeds to performing a write operation of a critical section (block 505). Afterwards, an egress counter (block 506) is updated (e.g., incremented) and then the PID field is reset to the expected value (block 507).

Figure 6:
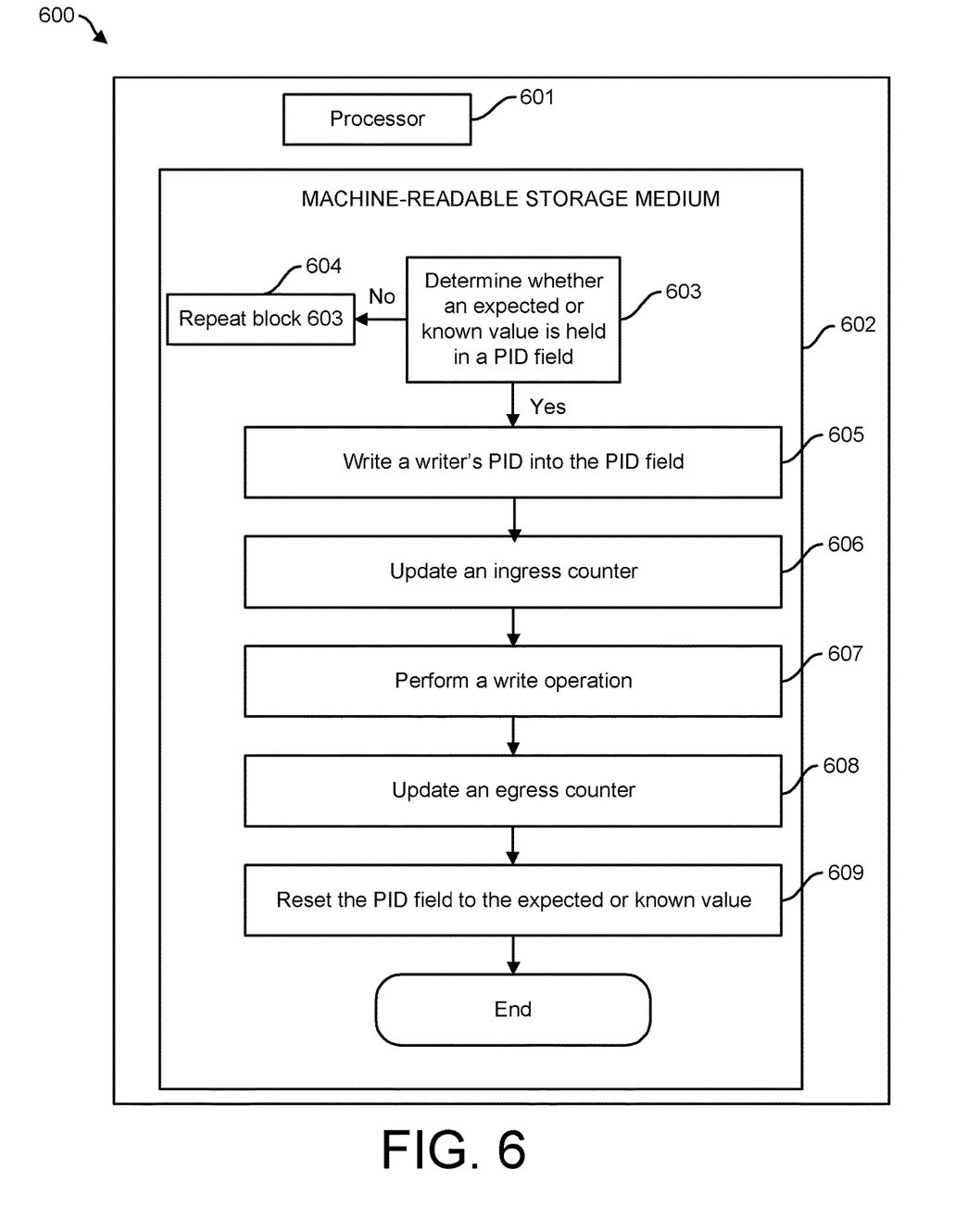
FIG. 6 is a computer network which can perform concurrent write operations, according to one or more examples of the present disclosure.

FIG. 6 is a computer network 600 which can perform concurrent write operations, according to one or more examples of the present disclosure. Computer network 600 may include a non-transitory computer-readable medium 602 that includes computer-executable instructions 603-609 held thereon that, when executed by one or more processing units 601 (one shown), causes the one or more processing units 601 to perform a concurrent write operation.

Computer-executable instructions 603 permit computer network 600 to determine whether an expected value is held in a PID field in response to initiating a write operation to one or more memory elements. The size (e.g., in bits) of the PID memory element (e.g., PID field) may determine a number of concurrent users that can write to the shared memory within a memory fabric. For example, the PID memory element to be written is a 128-bit memory element. Next, computer-executable instructions 604 repeat computer executable instructions 603 if the expected or known value is not held in the PID field. Alternatively, if the expected or known value is held in the PID field, write a writer's PID into the PID field 605.

Next, computer-executable instructions 606 permit computer network 600 to increment an ingress counter. After the ingress counter is incremented, computer-executable instructions 607 perform a write operation. Next, computer network 600 includes computer-executable instructions 608 to increment an egress counter. In addition, the computer network 600 includes computer-executable instructions 609 to reset the PID field to the expected or known value.

Figure 7:
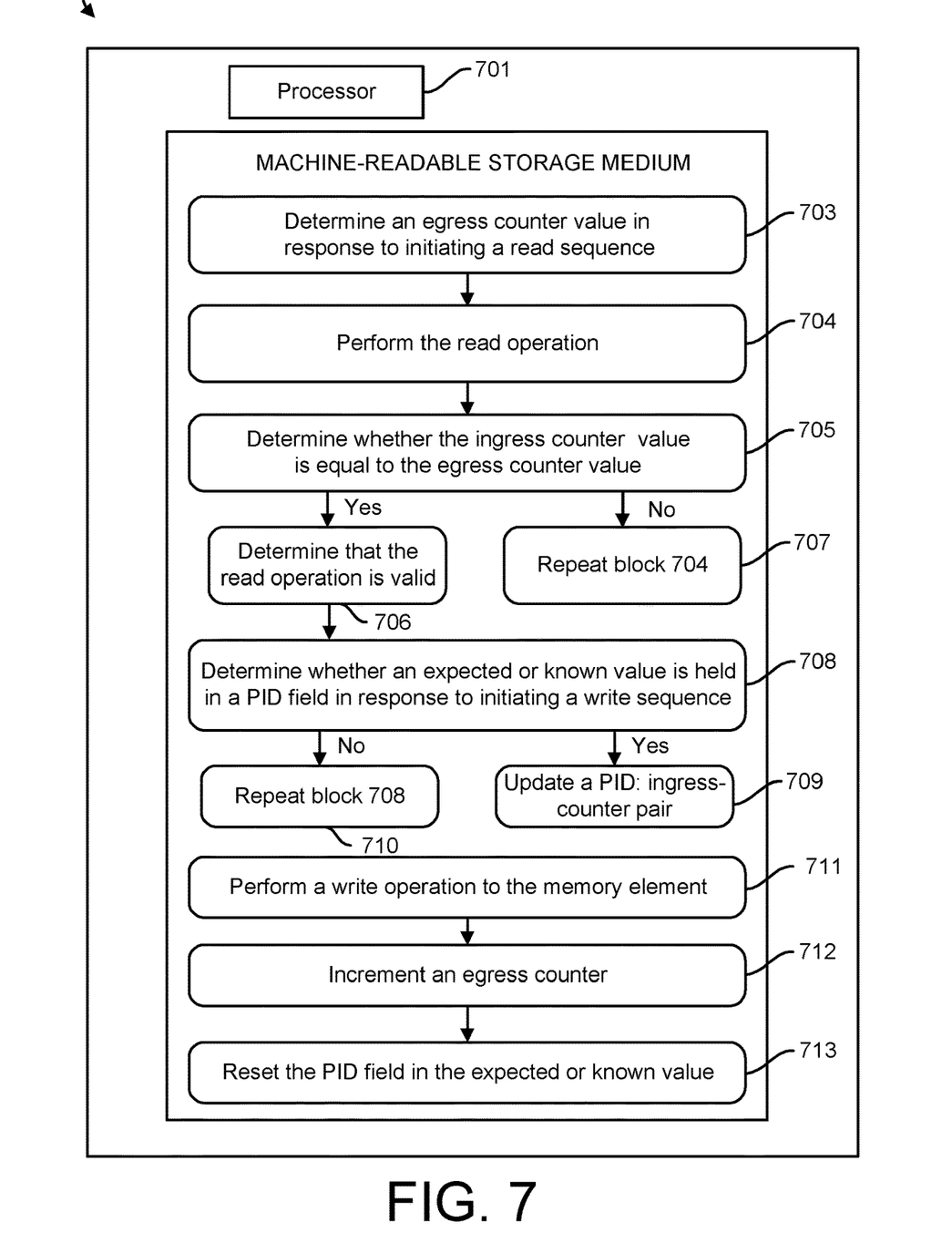
FIG. 7 is a computer network which can perform concurrent read and write operations, according to one or more examples of the present disclosure.

FIG. 7 is a computer network 700 which can perform concurrent read and write operations, according to one or more examples of the present disclosure. Computer network 700 may include a non-transitory computer-readable medium 702 that includes computer-executable instructions 703-707 stored thereon that, when executed by one or more processing units 701 (one shown), causes the one or more processing units 701 to perform a concurrent read operation. In addition, the computer-readable medium 702 includes computer-executable instructions 708-713 to perform a concurrent write operation. In some implementations, computer network 700 performs a concurrent read and write operation sequentially. In addition, a single node may perform both read and write operations.

Computer-executable instructions 703 permit computer network 700 to determine an egress counter value in response to initiating a read operation of one or more memory elements of a memory fabric. In some implementations, the memory fabric includes a shared byte-addressable, non-volatile memory and therefore the one or more memory elements to be read is byte-addressable. In addition, computer-executable instructions 704 permit computer network 700 to perform the read operation of the one or more memory elements. Further, computer-executable instructions 705 permit computer network 700 to determine whether the ingress counter value is equal to the egress counter value after the ingress counter value is read. Determine that the read operation is valid if the ingress counter value is equal to the egress counter value (block 706). Furthermore, computer network 700 includes computer-executable instructions 707 to repeat block 703 (e.g., re-attempt the read sequence if the ingress counter value is unequal to the egress counter value).

Next, computer-executable instructions 708-713 permit a concurrent write operation to be performed by the computer network 700. Computer-executable instructions 708 include determining whether an expected or known value is held in a PID field in response to initiating a write operation to one or more memory elements. If it is determined that an expected or known value is held in a PID field, computer network 700 executes computer-executable instructions 710 which repeat computer-executable instructions 708. Alternatively, if it is determined that an expected or known value is not held in a PID field, computer network 700 executes computer-executable instructions 709 which cause the computer network 700 to increment an ingress counter and write a writer's PID into a PID field in an atomic fashion.

In addition, the computer-executable instructions 711 include performing a write operation to one or more memory elements. After the write operation, computer network 700 executes computer-executable instructions 712 which causes the computer network 700 to increment an egress counter and computer-executable instructions 713 to reset the PID field to the expected or known value.

Figure 8A:
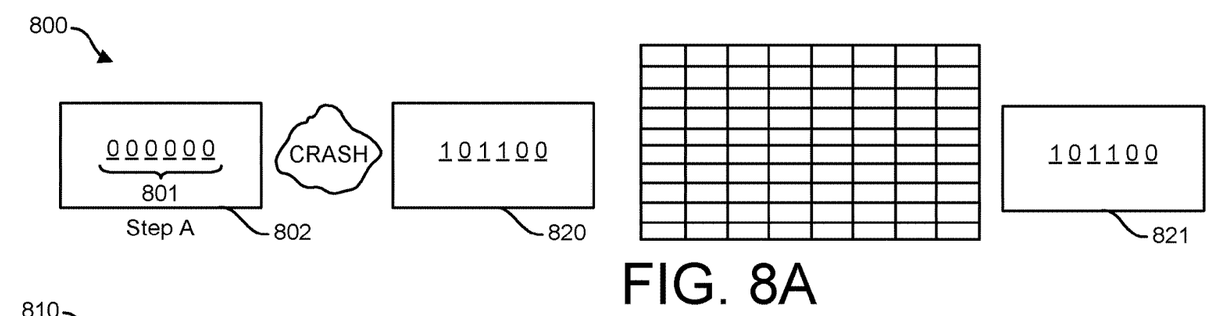
FIGS. 8A-8C are illustrations of process flows for a recovery process after a system crash during concurrent read or write operations, according to a system or method of the present disclosure.
Figure 8B:
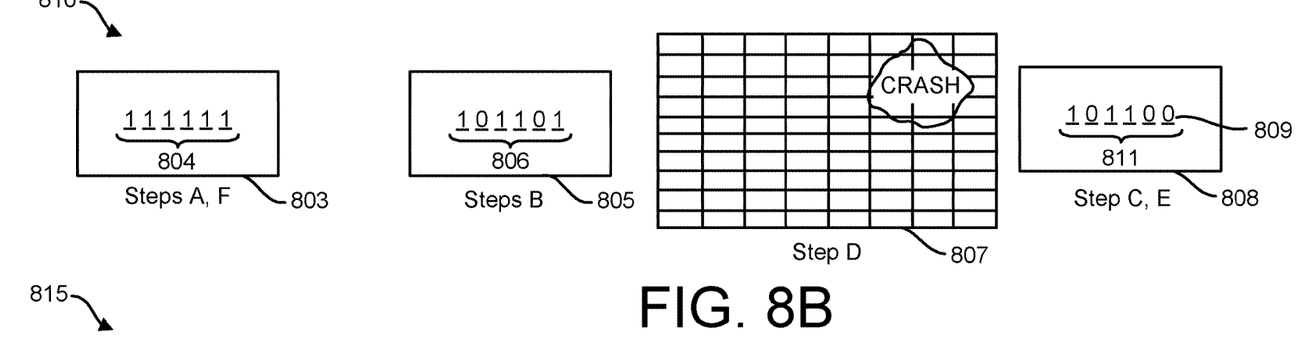
Figure 8C:
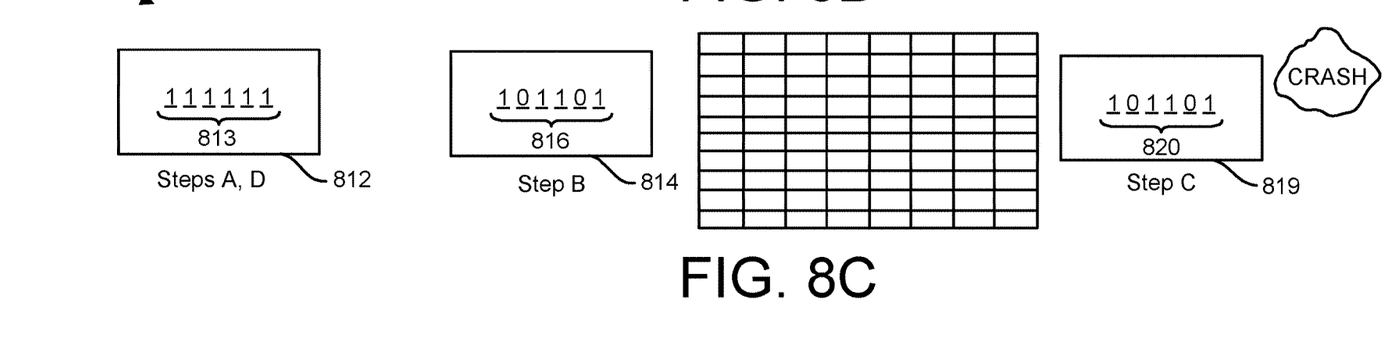

FIGS. 8A-8C are illustrations of process flows 800, 810, 815 for a recovery process after a system crash during concurrent read or write operations, according to a system or method of the present disclosure. Because a read sequence or a write sequence can crash at any point during the process, a recovery process consistent with the present disclosure can be instituted to minimize the effects of the crash. In some implementations, the process identification ("PID") held in a PID field can be compared with the PID associated with a writer. In some implementations, the PID held in a PID field can be compared with a well-known, expected value that indicates that a write sequence was not in progress. If the PID field holds the expected value, then the recovery process determines that the system was not in the middle of writing to the shared memory. Process flow 800 illustrates an example where the system was not in the middle of updating the shared memory of the memory fabric 807 during a write sequence.

Notably, process flow 800 shows that a crash occurred before a new PID 801 is held in the identifier memory element (e.g., PID field 802) (Step A). Accordingly, as the PID field 802 reflects an expected value of "NONE," no further recovery action is taken since the prior process (e.g., write) was not in the process of making changes to the shared memory.

Alternatively, process flows 810, 815 illustrate examples of recovery processes after a system failure that are implemented during or after a write operation which has occurred on the memory fabric 807. In particular, process flow 810 illustrates an example recovery process when the counter value 806 of the ingress counter 805 and the counter value 811 of the egress counter 808 are different. In the example shown, a crash occurs during the writing of one or more memory elements in a memory fabric 807.

The process flow 810 exhibits a recovery protocol that begins with comparing the PID of the writer with the PID 804 presently held in the PID field 803 (Step A). If the PID 804 is the same as the PID associated with the writer, the counter value 806 of the ingress counter 805 is compared with the counter value 811 of the egress counter 808 (Steps B and C). If the counter values 806, 811 are different, the recovery process infers that a crash occurred during a write sequence. As shown in FIG. 8, the counter values 806, 811 are off by one digit as shown by bit 809 in the counter value 811 of egress counter 808. Next, because it was determined that the recovery process infers that the crash occurred during a write sequence, the recovery process may attempt to re-initiate the write operation in the appropriate memory element (Step D).

The recovery protocols described herein may further include redo logging or undo logging in some examples not shown. It should be understood by those having ordinary skill in the art having the benefit of this disclosure that re-initiating a write sequence may be accomplished by any of several methods.

After the write operation is performed, the egress counter 808 is incremented such that the counter value 811 is equal to the counter value 806 of the ingress counter 805 (Step E).

After the egress counter 808 is incremented, the PID value 804 in PID field 803 is incremented to an expected value (e.g., "000000") (Step F).

In addition, FIG. 8 provides a process flow 815 which exhibits a recovery protocol for a crash event which occurs after a writer has incremented an egress counter 819. First, the recovery process begins with comparing the PID value 813 with a PID value associated with a writer (Step A). After the comparison is made, the counter value 816 within the ingress counter 814 is read (Step B) and compared with the counter value 820 within the egress counter 819 (Step C). As shown in the figure, the counter value 816 is the same as the counter value 820 which indicates that the crash occurred after a write operation as illustrated in the process flow 815 for an implementation which atomically writes a PID to the PID field and increments the ingress counter. The PID field 812 is reset to an expected value (e.g., "000000") in Step D.

In the event that a crash occurs during a read sequence, a recovery protocol may institute that the read sequence be performed again in the sequence described in this disclosure. Notably, no further recovery action is needed to be performed as the shared memory is protected by a locking mechanism during the read sequence.

Moreover, the present disclosure extends recovery protocols to recover from a crash that occurred during a present crash recovery sequence. In one implementation, if a crash-recovery sequence is a read sequence, and if the crash-recovery sequence crashes, the failed crash-recovery sequence will have no impact on the system state. Notably, a read sequence does not change any global state visible to any other sequence.

In addition, if a crash-recovery sequence is a write sequence (i.e., a crash-recovery write sequence), and if the write sequence crashes again while recovering from a crash, the crash-recovery write sequence makes no observable difference in a subsequent attempt to recover because the crash-recovery write sequence first reads the PID field to identify whether it had crashed previously which is independent of whether it is recovering from a first crash or a subsequent crash. Furthermore, the PID field is cleared, which may be the last step in the crash-recovery write sequence and therefore serves as a linearization point for a successful crash recovery. If the PID field matches the PID of the recovering sequence and if the ingress and egress counters are the same, the crash-recovery write sequence does not attempt to modify the shared data but simply clears the PID field. Finally, when the ingress and egress counters do not match, the critical section can be re-instituted after the first crash or after recovering from the crash that occurred during the crash-recovery write sequence.

The foregoing description, for purposes of explanation, used specific nomenclature to provide a thorough understanding of the disclosure. However, it may be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

The invention claimed is:

1. A non-transitory computer-readable medium comprising computer-executable instructions stored thereon that, when executed by one or more processing units, causes the one or more processing units to:
   in response to initiating a write sequence to a shared memory,
   check a process identification ("PID") field to determine whether a write sequence is in progress;
   if the write sequence is not in progress, set the PID field to a unique process identification associated with a writer and increment an ingress counter;
   perform a write operation to the shared memory;
   increment an egress counter; and
   reset the data in the PID field to an expected value.

2. The non-transitory computer-readable medium of claim 1, wherein checking the PID field to determine whether the write sequence is in progress includes checking whether the data in the PID field is the expected value.

3. The non-transitory computer-readable medium of claim 1, further comprising computer-executable instructions to permit concurrent reading of the shared memory.

4. The non-transitory computer-readable medium of claim 1, wherein the expected value is nil.

5. The non-transitory computer-readable medium of claim 1, wherein if the write sequence is in progress, a subsequent write operation is prevented from executing.

6. The non-transitory computer-readable medium of claim 1, wherein setting the PID field to the unique process identification associated with the writer and incrementing the ingress counter are performed atomically.

7. The non-transitory computer-readable medium of claim 1, wherein if the write sequence is in progress, the writer re-attempts the write operation after a pre-determined time period.

8. The non-transitory computer-readable medium of claim 1, wherein to write a PID associated with the writer to the PID field constitutes obtaining exclusive access to a memory lock.

9. The non-transitory computer-readable medium of claim 1, wherein the shared memory includes byte-addressable, non-volatile memory.

10. A non-transitory computer-readable medium comprising computer-executable instructions stored thereon that, when executed by one or more processing units, causes the one or more processing units to:
    in response to initiating a read sequence of shared memory,
    determine an egress counter value;
    perform a read operation of the shared memory;
    determine an ingress counter value;
    if the egress counter value is not equal to the ingress counter value, re-attempt to perform the read sequence; and
    if the egress counter value is equal to the ingress counter value, determine that the read operation is valid.

11. The non-transitory computer-readable medium of claim 10, wherein if the egress counter value is not equal to the ingress counter value, the read sequence may be re-attempted according to a pre-determined time period.

12. The non-transitory computer-readable medium of claim 10, wherein the shared memory is within a memory fabric which has byte-addressable, non-volatile memory.

13. The non-transitory computer-readable medium of claim 10 further comprising computer-executable instructions to permit concurrent reading of the shared memory.

14. A non-transitory computer-readable medium comprising computer-executable instructions stored thereon that, when executed by one or more processing units, causes the one or more processing units to:
    in response to initiating a recovery process,
    determine whether a PID field holds an expected value;
    compare a value of an ingress counter with a value of an egress counter and determine that a crash occurred during a write sequence if the values of the ingress counter and the egress counters are different; and
    determine that the crash did not occur during the write sequence if the values of the ingress counter and the egress counters are the same.

15. The non-transitory computer-readable medium of claim 14, further comprising instructions to determine that the crash did occur during the write sequence if the values of the ingress counter and the egress counters are not the same.

16. The non-transitory computer-readable medium of claim 14, wherein it is determined that the crash occurred if the PID field does not hold the expected value.

17. The non-transitory computer-readable medium of claim 14, further comprising instructions to reset the PID field to the expected value if the values of the ingress counter and the egress counters are the same.

18. The non-transitory computer-readable medium of claim 14, wherein the system comprises:
    a memory fabric having a plurality of shared and byte-addressable, non-volatile memory;
    an ingress counter, wherein the ingress counter is incremented for each write sequence and an ingress counter value associated with each ingress counter is determined for each read sequence; and
    an egress counter, wherein the egress counter is incremented for each write sequence and an egress counter value associated with each egress counter is determined for each read sequence; and
    a PID field to hold an expected value or a PID associated with a writer when a writer first attempts to perform a write sequence.

19. The system of claim 14, wherein the disaggregated shared, persistent byte-addressable memory is accessible by a plurality of nodes.

20. The system of claim 14, wherein the memory fabric comprises at least one or more of a set of memristor, phase change memory, resistive RAM (ReRAM), magnetic RAM (MRAM), non-volatile dual in-line memory modules (NVDIMM), or battery-backed dynamic random-access memory (DRAM) devices.

* * * * *